US009857592B2

(12) United States Patent
Tokuhara et al.

(10) Patent No.: US 9,857,592 B2
(45) Date of Patent: Jan. 2, 2018

(54) DISPLAY DEVICE

(71) Applicant: Panasonic Intellectual Property Management Co., Ltd., Osaka (JP)

(72) Inventors: Takeyoshi Tokuhara, Osaka (JP); Seiji Nishiwaki, Hyogo (JP); Tsuguhiro Korenaga, Osaka (JP); Yoshio Shimbo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 126 days.

(21) Appl. No.: 14/859,203

(22) Filed: Sep. 18, 2015

(65) Prior Publication Data

US 2016/0091721 A1 Mar. 31, 2016

(30) Foreign Application Priority Data

Sep. 29, 2014 (JP) ................................ 2014-198908

(51) Int. Cl.
*G02B 27/01* (2006.01)
*G02C 11/00* (2006.01)
*G03B 21/00* (2006.01)

(52) U.S. Cl.
CPC .......... *G02B 27/0172* (2013.01); *G02C 11/10* (2013.01); *G02B 2027/0123* (2013.01);
(Continued)

(58) Field of Classification Search
CPC .............. G02B 27/017; G02B 27/0172; G02B 27/0174; G02B 27/0176; G02B 27/0178;
(Continued)

(56) References Cited

U.S. PATENT DOCUMENTS 6,771,424 B1 * 8/2004 Amafuji ............. G02B 27/0176
345/53
2006/0221266 A1 * 10/2006 Kato .................... G02B 27/017
348/838

(Continued)

FOREIGN PATENT DOCUMENTS

JP 4-208996 7/1992
JP 8-166557 6/1996
(Continued)

*Primary Examiner* — Christina Riddle
*Assistant Examiner* — Christopher Lamb, II
(74) *Attorney, Agent, or Firm* — McDermott Will & Emery LLP

(57) ABSTRACT

A display device of the disclosure includes a projector including optical elements to project images on left or right eye of an observer and a frame connected to the projector for mounting on the observer. With the frame mounted on the observer, at least part of the projector is placed in visual fields of the eyes, and length from tangent point between leftmost one among lines of sight of the left eye overlapping outline of at least the part and the outline to intersection between an imaginary line through the tangent point parallel to direction of pupillary distance of the observer and rightmost one among lines of sight of the right eye overlapping the outline is shorter than the pupillary distance in a top plan view of the display device.

10 Claims, 6 Drawing Sheets

(52) U.S. Cl.
CPC ........... *G02B 2027/0134* (2013.01); *G02B 2027/0178* (2013.01)

(58) Field of Classification Search
CPC ........ G02B 27/0179; G02B 2027/0174; G02B 2027/0178
See application file for complete search history.

(56) References Cited

U.S. PATENT DOCUMENTS

| | | | |
|---|---|---|---|
| 2007/0058261 | A1 | 3/2007 | Sugihara et al. |
| 2009/0073082 | A1* | 3/2009 | Yoshikawa ........ G02B 27/0172 345/8 |
| 2009/0128919 | A1* | 5/2009 | Kim ................... G02B 27/0172 359/630 |
| 2010/0177284 | A1* | 7/2010 | Moizio ................. G03B 21/28 353/75 |
| 2013/0214999 | A1 | 8/2013 | Hiraki et al. |
| 2016/0077345 | A1* | 3/2016 | Bohan ...................... G02C 7/16 349/13 |

FOREIGN PATENT DOCUMENTS

| | | |
|---|---|---|
| JP | 2003-502714 | 1/2003 |
| JP | 2006-003879 | 1/2006 |
| JP | 2010-097228 | 4/2010 |
| JP | 2011-229024 | 11/2011 |
| JP | 2012-173666 | 9/2012 |
| WO | 2000/079330 | 12/2000 |

\* cited by examiner

DISPLAY DEVICE

BACKGROUND

1. Technical Field

The present disclosure relates to a head-mounted display device.

2. Description of the Related Art

Among head-mounted display devices, there are devices of so-called see-through type that have a function which allows an observer to simultaneously observe a scene on outside of the display device and an image displayed in the display device without interruption of view of the observer. Hereinbelow, the function will be referred to as "see-through function" and will be described.

This technique is intended for making it easier for the observer viewing an image displayed in the head-mounted display device to take another action, avoiding a risk that may be caused by the interruption of the view when the device is used outdoors, or the like.

Methods for attaining the see-through function fall roughly into following two categories.

In one category, as disclosed in Japanese Unexamined Patent Application Publication No. 4-208996, an optical component placed in front of an eye of an observer, among components that form the display device, is provided as a half mirror.

In this method, light on the outside of the display device penetrates through the half mirror and is incident on the eye of the observer. Thus the method attains the see-through function that allows superposition and simultaneously view of the scene on the outside of the display device and the displayed image.

In the other category of methods, as disclosed in Japanese Unexamined Patent Application Publication No. 2006-3879, a component placed in front of an eye of an observer, among components that form the display device, has a decreased size.

In the method disclosed in Japanese Unexamined Patent Application Publication No. 2006-3879, the see-through function is attained by making the optical component placed in front of the eye of the observer, among the components that form the display device, thinner than a diameter of a pupil of the observer so that an image displayed in the display device and light on the outside of the display device may respectively be projected on partitions of the pupil.

SUMMARY

In one general aspect, the techniques disclosed here feature a display device that includes a projector including an optical element that projects an image on one of left and right eyes of an observer and a frame that is connected to the projector and that is mountable on the observer. In the display device, at least a part of the projector is placed in a visual field of the left eye and a visual field of the right eye, when the frame is mounted on the observer, and a length from a point of tangency between a leftmost line of sight among lines of sight of the left eye that overlap outline of the at least the part of the projector and the outline to a point of intersection between an imaginary line that passes through the point of tangency in parallel with a direction of a pupillary distance of the observer and a rightmost line of sight among lines of sight of the right eye that overlap the outline is shorter than the pupillary distance in a top plan view of the display device when the frame is mounted on the observer.

In the display device according to the one aspect of the disclosure, a visual field for surroundings is ensured by complementary relation between the visual fields of both the eyes and the see-through function is attained even if material of a component such as an exit surface that is placed in the visual fields of the observer blocks penetration of surrounding light. Size of the exit surface can be made larger than a diameter of a pupil and this is advantageous for increase in angle of view of displayed images.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1A:
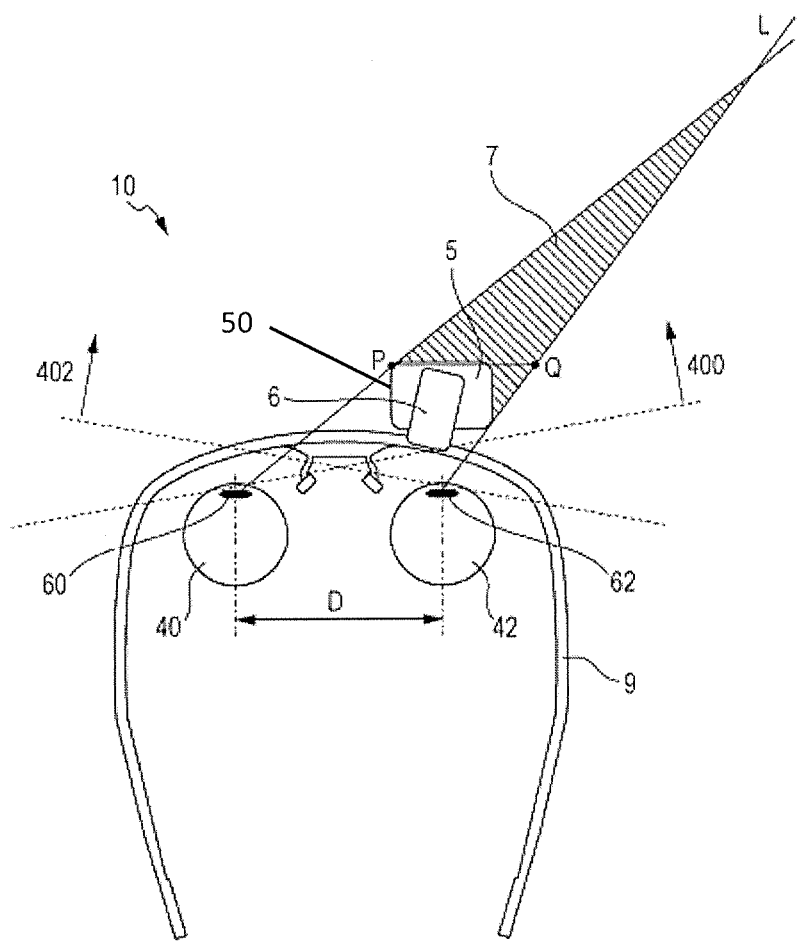
FIG. 1A is a top plan view that schematically illustrates a structure of a display device and positional relation of the display device to both eyes of an observer in an exemplary embodiment.

The inventors of the disclosure investigated conventional display devices in detail and thereby found that the display devices had following problems.

In the method with use of the half mirror that is disclosed in Japanese Unexamined Patent Application Publication No. 4-208996, stray light is caused by incidence of light outside the display device on optical components in the display device. The stray light that turns into noises reduces visibility of an image displayed by the display device and a scene on the outside of the display device. With use of a light shielder as a part of a member that holds the half mirror, for instance, for reduction in occurrence of the stray light, the light shielder interrupts view of the observer.

The method disclosed in Japanese Unexamined Patent Application Publication No. 2006-3879 has difficulty in increase in angle of view because the optical component in front of the eye is decreased in size.

The inventors of the disclosure found out such problems of related arts as described above and invented a novel head-mounted display device. Outlines of embodiments of the disclosure are as follows.

A display device according to a first aspect of the disclosure includes a projector including an optical element that projects an image on one of left and right eyes of an observer and a frame that is connected to the projector and that is mountable on the observer. The display device is provided in which at least a part of the projector is placed in a visual field of the left eye and a visual field of the right eye, when the frame is mounted on the observer, and in which a length from a point of tangency between a leftmost line of sight among lines of sight of the left eye that overlap outline of the at least the part of the projector and the outline to a point of intersection between an imaginary line that passes through the point of tangency in parallel with a direction of a pupillary distance of the observer and a rightmost line of sight among lines of sight of the right eye that overlap the outline is shorter than the pupillary distance in a top plan view of the display device when the frame is mounted on the observer.

In the display device according to the first aspect, a see-through function which is advantageous for the increase in the angle of view can be attained even in a configuration in which a light shielder resides in the view of the observer.

In a second aspect of the disclosure, the projector may be placed between an imaginary line that passes through a pupil of the left eye and that is perpendicular to the direction of the pupillary distance and an imaginary line that passes through a pupil of the right eye and that is perpendicular to the direction of the pupillary distance in the top plan view when the frame is mounted on the observer in the first aspect.

In the second aspect, position of a displayed image can be set in front of the observer and thus the visibility of the displayed image is improved.

In a third aspect of the disclosure, the projector may further include a light emitting element and a light shielder that blocks penetration of light on outside of the projector and the optical element may project light, emitted from the light emitting element, as a virtual image onto the one of the left eye and the right eye, in addition to the first aspect or the second aspect.

The light emitting element according to the third aspect is a light source such as an LED for use in a liquid crystal display or an electroluminescence (EL) element for use in an organic EL display, for instance. The light emitting element may be an optical resonator for use in a scanning display.

In the third aspect, ghost light that may be caused by surrounding light passing through the optical element can be reduced. In the third aspect, surroundings shielded from view by the light shielder can be viewed by the observer.

In a fourth aspect of the disclosure, the light shielder may be placed at a position where the light shielder interrupts a portion of the view of the observer in the third aspect.

In a fifth aspect of the disclosure, the length between the point of tangency and the point of intersection may be shorter than 6.3 cm in any of the first through fourth aspects.

In a sixth aspect of the disclosure, a connector may further be provided and the projector and the frame may be connected through the connector, in addition to any of the first through fifth aspects. In a seventh aspect of the disclosure, a boundary between a visible area that is an area visible to the observer and an invisible area that is an area invisible to the observer may be defined by interruption by the at least the part of the projector to view of the observer in the visual field of the left eye and the visual field of the right eye, when the frame is mounted on the observer, in any of the first through sixth aspects.

In an eighth aspect of the disclosure, the projector may further include a display element that displays an image, the optical element may include a plurality of lenses, the display element may be partitioned into a plurality of partition areas, the plurality of lenses may be placed corresponding to the plurality of partition areas, and images displayed on the plurality of partition areas may be formed as virtual images so as to be superposed on one image surface, in addition to any of the first through seventh aspects.

In the eighth aspect, the lenses are placed corresponding to the partition areas and thus diameters of the lenses are relatively reduced. Accordingly, focal lengths of the lenses can be decreased. That is, the display device can be thinned.

In a ninth aspect of the disclosure, the projector may further include a display element that displays an image, the optical element may include a plurality of lenses, the display element may be partitioned into a plurality of partition areas, the plurality of lenses may be placed corresponding to the plurality of partition areas, and images displayed on the plurality of partition areas may be formed as virtual images on different image surfaces, in addition to any of the first through seventh aspects.

In the ninth aspect, the images different in display distance can be shown to the observer.

In a tenth aspect of the disclosure, an adjuster that turns the projector about an axis extending in a vertical direction may further be provided, in addition to any of the first through ninth aspects.

In the tenth aspect, the observer may select whether an image is to be viewed by the left eye or by the right eye and thus visibility is improved.

Hereinbelow, more specific embodiments will be described with reference to the drawings.

Following description relates to an example of the disclosure and the disclosure is not limited by the description.

Figure 1B:
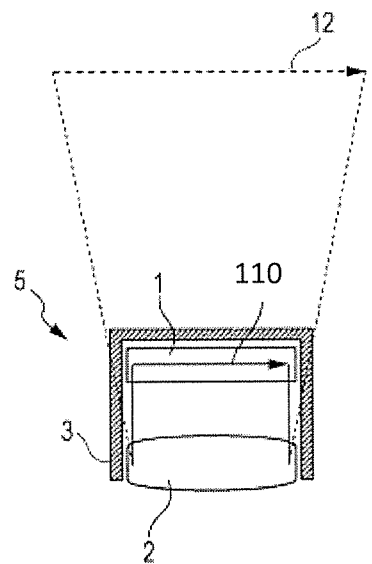
FIG. 1B is a schematic sectional view of a projector of the display device according to the embodiment.
Figure 1C:
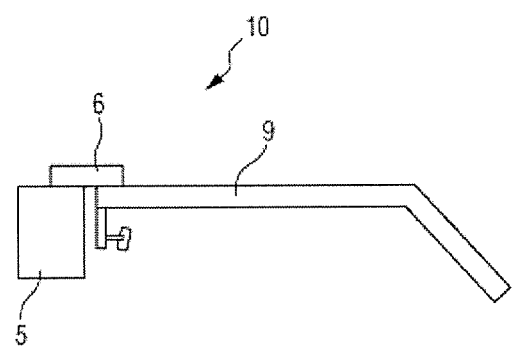
FIG. 1C is a side view that schematically illustrates the structure of the display device in the embodiment.

FIG. 1A is a schematic diagram of a display device 10 according to the embodiment. FIG. 1A illustrates a top plan view of the display device 10 that includes a left eye 40 and a right eye 42 of an observer. FIG. 1B is a schematic sectional view of a projector 5 of the display device 10 according to the embodiment. FIG. 1C is a side view that schematically illustrates a structure of the display device in the embodiment. The display device 10 displays an image on one of the left and right eyes of the observer. The image to be displayed may be projected on either of the left and right eyes of the observer. For the embodiment, an example in which the image is projected on the right eye 42 will be described.

The display device 10 has the projector 5 including an optical element 2 that projects the image on the right eye 42 of the observer, a frame 9 that is mountable on the observer, and a connector 6 that makes connection between the projector 5 and the frame 9. When the display device 10 is mounted on the observer, at least a part of the projector 5 is placed in a visual field 400 of the left eye and a visual field 402 of the right eye of the observer. In the embodiment, as illustrated in FIG. 1B, the projector 5 includes a display element 1, the optical element 2, and a holder 3.

The display element 1 is a liquid crystal display or an organic EL display, for instance.

The optical element 2 guides video light from the display element 1 into the eye of the observer and projects the video light as a magnified virtual image. The optical element 2 includes at least any one of a refracting surface, a reflecting surface, and a diffractive surface. Number and shapes of optical elements and positional relation between the optical elements and the display element 1 are not limited to a configuration of FIG. 1B.

The projector 5 may include a scanning display element in place of the display element 1 and the optical element 2. That is, substitution of the display element that shows the observer a two-dimensional displayed image by projection of a beam of light from a light source such as a laser scanned by a scanner onto a retina of the observer may be made.

The holder 3 has a function of at least temporarily holding the positional relation between the display element 1 and the optical element 2. The holder 3 may be made of material with a high transmittance so as to form an optical path for the projection of the video light. At least a part of the holder 3 that surrounds the optical element 2 may be made of a light shielder. Use of the light shielder may keep ghost from occurring due to intrusion of undesired light and may keep the visibility of the displayed image from deteriorating due to intensity difference with surrounding light. The holder 3 may include a mechanism capable of adjusting the positional relation between the display element 1 and the optical element 2 manually or automatically. The optical element 2 is a lens, for instance.

Herein, (1) the projector includes the optical element that projects an image on either eye of the observer and, (2) when the display device is mounted on the observer, at least the part of the projector is placed in the visual field of the left eye and the visual field of the right eye of the observer. By the interruption by at least the part of the projector to the view of the observer, the boundary between the visible area that is visible to the observer and the invisible area that is invisible to the observer is defined in the visual field of the left eye and the visual field of the right eye of the observer. The whole projector may be placed in the visual field of the left eye and the visual field of the right eye of the observer when the display device is mounted on the observer.

On condition that the projector 5 of the display device 10 includes the display element 1 and the optical element 2 and that the display element 1 is placed out of the visual fields of the observer, for instance, accordingly, the optical element 2 satisfies a condition (2) described above. By interruption by at least the optical element 2 in the projector 5 to the view of the observer, in this configuration, the boundary between the visible area and the invisible area is defined in the visual field of the left eye and the visual field of the right eye of the observer. The same applies on condition that a part of the optical element 2 is placed out of the visual fields of the observer. By interruption to the view of the observer by the other part of the optical element 2 placed in the visual fields of the observer, in this configuration, the boundary between the visible area and the invisible area is defined in the visual field of the left eye and the visual field of the right eye of the observer. In a configuration in which the projector 5 further includes the holder 3 and in which a part of the holder 3 is made of the light shielder, the part of the holder 3 that is the light shielder satisfies the condition (2) described above. By interruption by at least the part of the holder 3 that is the light shielder in the projector 5 to the view of the observer, in this configuration, the boundary between the visible area and the invisible area is defined in the visual field of the left eye and the visual field of the right eye of the observer. The same applies on condition that the projector 5 includes the scanning display element.

The frame 9 includes a mechanism for fixing the display device 10 to the observer. FIGS. 1A to 1C illustrate an example in which the frame 9 is a glassframe and in which the display device 10 is fixed to a head of the observer.

The frame 9 is connected through the connector 6 to the projector 5. Positional relation between the projector 5 and the observer is held by this connection. The connector 6 may include a mechanism for adjusting the positional relation between the projector 5 and the observer. The display device 10 may lack the connector 6 and direct connection between the frame 9 and the projector 5 may be made by adhesive or screws, for instance.

Hereinbelow, the positional relation between the projector 5 and the observer will be described with FIG. 1A referred to again.

When the observer moves a line of sight of the left eye 40 from left end to right end of the visual field of the left eye 40 of the observer, the line of sight of the left eye 40 starts to overlap an outline 50 of the projector 5 at a point P of tangency, as illustrated in FIG. 1A. That is, the point P of tangency is equivalent to a point of tangency between a leftmost line of sight among the lines of sight of the left eye 40 that overlap the outline 50 of the projector 5 and the outline 50 of the projector 5. When the observer moves a line of sight of the right eye 42 from right end to left end of the visual field of the right eye 42 of the observer, similarly, the line of sight of the right eye 42 starts to overlap the outline 50 of the projector 5. Then the line L of sight of the right eye 42 is equivalent to a rightmost line of sight among the lines of sight of the right eye 42 that overlap the outline 50 of the projector 5. An imaginary straight line that passes through the point P of tangency in parallel with a direction of a pupillary distance D of the observer intersects with the line L of sight at a point Q of intersection. In the embodiment, a length between the point P of tangency and the point Q of intersection is shorter than the pupillary distance D of the observer. The length between the point P of tangency and the point Q of intersection can be adjusted by change in shape and size of the projector 5 and in position of the projector 5 relative to the left eye 40 and the right eye 42 of the observer.

Mean value of the pupillary distance D of human, that is, distance between pupil 60 of the left eye 40 and pupil 62 of the right eye 42 is 6.3 cm. Accordingly, the length between the point P of tangency and the point Q of intersection that is made shorter than 6.3 cm is shorter than the pupillary distance D of the observer.

On condition that the length between the point P of tangency and the point Q of intersection is shorter than the pupillary distance D of the observer, the leftmost line of sight among the lines of sight of the left eye 40 that overlap the outline 50 of the projector 5 and the line L of sight of the right eye 42 intersect with each other on a side opposite to the observer with respect to the projector 5, as illustrated in FIG. 1A. The visual field of the right eye 42 and the visual field of the left eye 40 are complemented with each other and the observer is therefore capable of viewing an area in the visual field of the left eye 40 or the visual field of the right eye 42 except an area surrounded by the outline 50 of the projector 5, the leftmost line of sight among the lines of sight of the left eye 40 that overlap the outline 50 of the projector 5, and the line L of sight of the right eye 42. The area surrounded by the outline 50 of the projector 5, the leftmost line of sight among the lines of sight of the left eye 40 that overlap the outline 50 of the projector 5, and the line L of sight of the right eye 42 is equivalent to the invisible area 7. As illustrated in FIG. 1A, the observer is able to view an object that exists behind the display device 10 from a viewpoint of the observer as long as the object is out of the invisible area 7, because the invisible area 7 is a finite area.

Figure 2A:
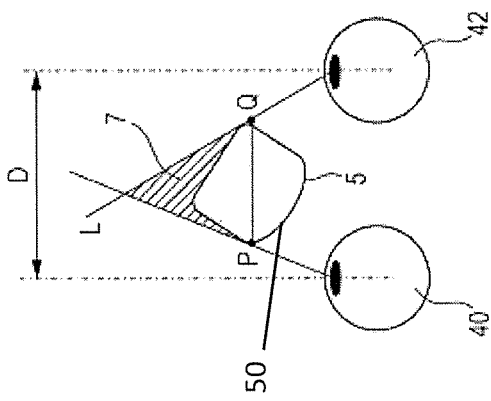
FIG. 2A is a schematic diagram that illustrates an invisible area in a reference example in which a projector resides on left side of a left eye of an observer.
Figure 2B:
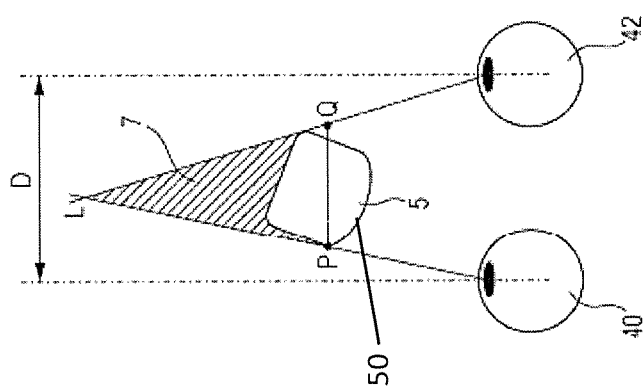
FIG. 2B is a schematic diagram that illustrates an invisible area in a modification to the embodiment in which the projector resides at a side nearer to nose with respect to both eyes of the observer.
Figure 2C:
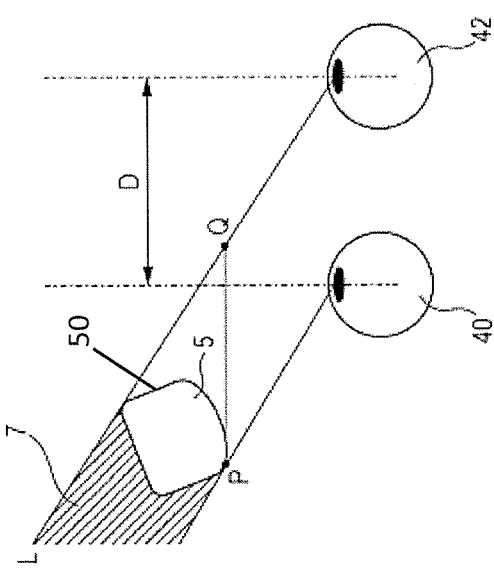
FIG. 2C is a schematic diagram that illustrates an invisible area in another modification in which the projector is made nearer to the observer than in the embodiment of FIG. 2B.

The smaller the size of the projector 5 is, the narrower the invisible area 7 can be made. The invisible area 7 can be narrowed by alteration in placement of the projector 5 even if the size of the projector 5 is fixed. FIGS. 2A through 2C are schematic diagrams that illustrate change in size of the invisible area 7 in accordance with the placement of the projector 5. In FIGS. 2A through 2C, the display device 10 has a fixed size. FIG. 2A is the schematic diagram that illustrates a reference example in which the projector 5 is placed at a position that is nearer to a left ear than the left eye 40. FIGS. 2B and 2C are the schematic diagrams that illustrate a modification to the embodiment in which the projector 5 is placed at a side that is near to nose with respect to both the eyes. When the display device is mounted on the observer, in the embodiment illustrated in FIGS. 2B and 2C, the projector 5 is placed between an imaginary line that passes through the pupil 60 of the left eye 40 and that is perpendicular to the direction of the pupillary distance and an imaginary line that passes through the pupil 62 of the right eye 42 and that is perpendicular to the direction of the pupillary distance.

In FIG. 2A, the length between the point P of tangency and the point Q of intersection is equivalent to the pupillary distance D. Therefore, the invisible area 7 extends infinitely.

In FIG. 2B, by contrast, the length between the point P of tangency and the point Q of intersection is shorter than the pupillary distance D. Therefore, the invisible area 7 is confined finitely. In FIG. 2B, the projector 5 is placed between the imaginary line that passes through the pupil 60 of the left eye 40 and that is perpendicular to the direction of the pupillary distance and the imaginary line that passes through the pupil 62 of the right eye 42 and that is perpendicular to the direction of the pupillary distance. Then position of a displayed image can be set so as to be in front of the observer and thus visibility is improved when the displayed image and an external scene are superposed to be viewed.

FIG. 2C illustrates the placement of the projector 5 that is made nearer to a face of the observer from a state of FIG. 2B. With this placement, position of a vertex of the invisible area 7 that is opposed to a line segment linking the point P of tangency and the point Q of intersection is made nearer to the face of the observer than the position in FIG. 2B and thus the invisible area 7 can be made narrower.

Distance x from center of the pupillary distance of the observer to the vertex of the invisible area 7 opposed to the line segment linking the point P of tangency and the point Q of intersection can be expressed as:

$$x = D \cdot d / (D - h) \quad (1)$$

(where h is the length between the point P of tangency and the point Q of intersection, D is the pupillary distance of the observer, and d is distance from the center of the pupillary distance of the observer to the line segment linking the point P of tangency and the point Q of intersection.)

The distance x may be smaller than a distance of distinct vision of the observer. Such a configuration attains the see-through function to the extent that the invisible area 7 causes no practical problems.

That is, the display device 10 in which x<20 cm holds in equation (1) does not obstruct view the observer commonly uses and has more ideal see-through function.

In such an extent, the projector 5 is provided at a position nearer to the observer. Accordingly, weight of the display device 10 the observer feels can be reduced for the display device 10 with the same weight.

More ideal see-through function can be attained by the frame 9 and other components associated with the display device 10 that satisfy conditions described above, that have transparent material used for parts thereof which are to come into the view, or that are placed at positions kept out of the view of the observer.

FIGS. 3A through 3D illustrate modifications of the projector 5. FIGS. 3A through 3D are schematic diagrams that illustrate embodiments in which the number and/or placement of the optical elements 2 the projector 5 includes are modified. In FIGS. 3A through 3D, the optical elements are lenses, for instance.

Figure 3A:
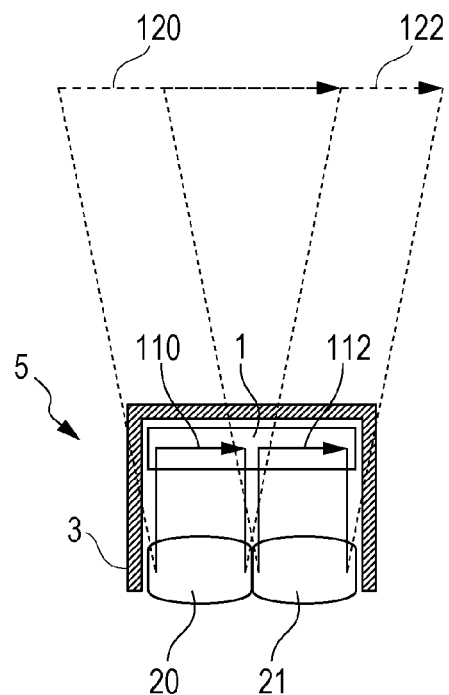
FIG. 3A is a schematic diagram that illustrates a modification of the projector according to the embodiment in which a plurality of optical elements are arranged in a direction along a surface of a display element.
Figure 3B:
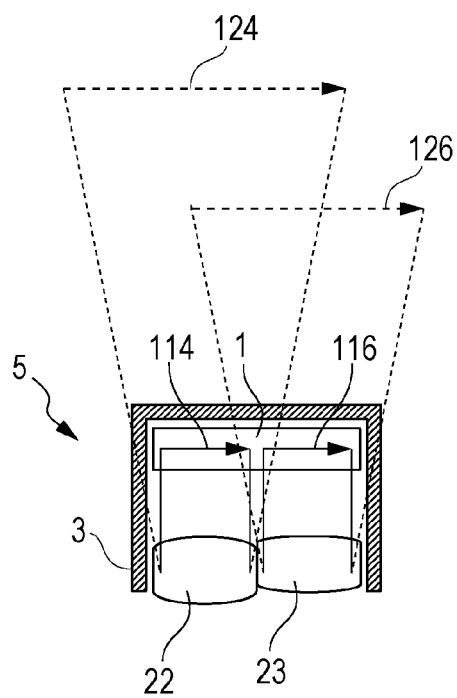
FIG. 3B is a schematic diagram that illustrates another modification of the projector according to the embodiment in which a plurality of optical elements arranged in the direction along the surface of the display element are placed at different positions with respect to a direction of optical axes thereof.

FIG. 3A illustrates the embodiment in which a plurality of optical elements 20, 21 are arranged in a direction along a surface of the display element 1. In FIG. 3A, the two optical elements 20, 21 are placed in the projector 5. FIG. 3B illustrates the embodiment in which a plurality of optical elements 22, 23 arranged in the direction along the surface of the display element 1 have different positions with respect to a direction of optical axes thereof.

In the embodiment of FIG. 3A, the display element 1 is partitioned into partition areas that are configured by the plurality of optical elements. The plurality of partition areas respectively display a displayed image 110 and a displayed image 112. The optical element 20, provided corresponding to the partition area that displays the displayed image 110, projects the displayed image 110 as a virtual image 120. The optical element 21, provided corresponding to the partition area that displays the displayed image 112, projects the displayed image 112 as a virtual image 122. The virtual image 120 and the virtual image 122 may be displayed while being superposed on substantially the same image surface or may be displayed with display timing changed in accordance with the displayed images.

In the embodiment of FIG. 3B, as with FIG. 3A, the display element 1 is partitioned into partition areas that are configured by the plurality of optical elements. The plurality of partition areas respectively display a displayed image 114 and a displayed image 116. The optical element 22, provided corresponding to the partition area that displays the displayed image 114, projects the displayed image 114 as a virtual image 124. The optical element 23, provided corresponding to the partition area that displays the displayed image 116, projects the displayed image 116 as a virtual image 126. With deviation in the positions of the optical elements 22, 23 with respect to the direction of the optical axes, the virtual images 124 and 126 can be formed on different image surfaces. Therefore, display distance can be switched over in accordance with the displayed image and the displayed images can be made perspective. The virtual images 124 and 126 may be formed on different image surfaces with focal lengths of the optical elements 22, 23 differentiated.

Figure 3C:
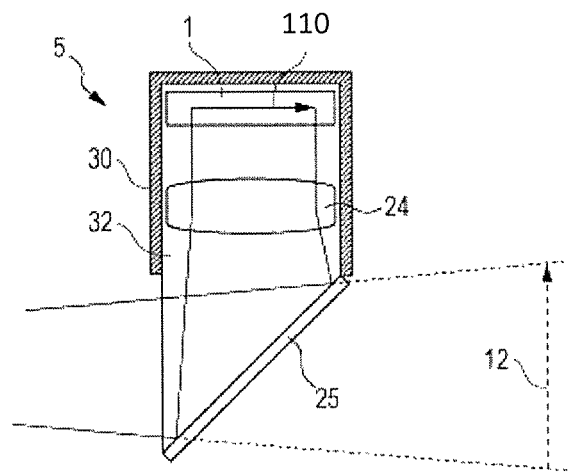
FIG. 3C is a schematic diagram that illustrates still another modification of the projector according to the embodiment.

FIG. 3C illustrates the embodiment in which an optical element 25 is provided in the projector 5, in addition to the display element 1 and an optical element 24. The optical element 25 is a mirror, for instance. In this embodiment, a holder 32 that forms an optical path and that is made of glass or resin, for instance, is included in a holder 30, so that the virtual image 12 is shown by projection of a beam of light reflected by the optical element 25 onto the observer. The optical element 25 can be provided with functions of the optical element 24 by provision of a curved surface on the optical element 25, for instance. In this configuration, the projector 5 may lack the optical element 24.

Figure 3D:
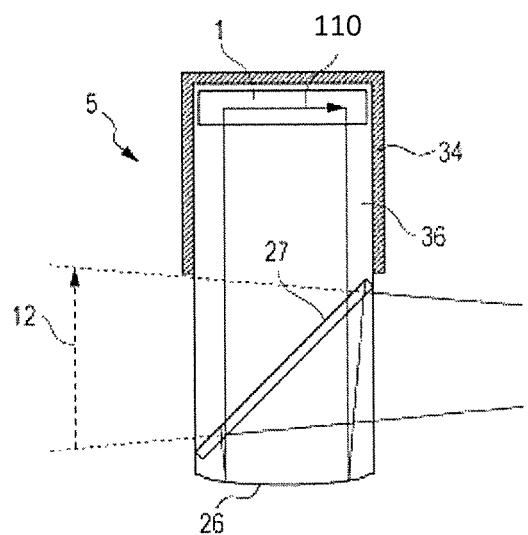
FIG. 3D is a schematic diagram that illustrates yet another modification of the projector according to the embodiment.

FIG. 3D illustrates the embodiment in which the projector 5 includes an optical element 26, an optical element 27, a holder 34, and a holder 36. The holder 36 is placed in the holder 34 and is made of glass or resin, for instance. The optical element 27 is placed in the holder 36. The optical element 26 is a curved mirror, for instance, and the optical element 27 is a half mirror, a beam splitter, or a dichroic mirror, for instance. In this embodiment, video light from the display element 1 that has penetrated through the optical element 27 forms an image while being reflected by the optical element 26 and a portion of that beam of light shows the observer the virtual image 12 by being reflected by the optical element 27. In a configuration example of FIG. 3D, a part of the holder 34 may be made of a light shielder, a part of which may be placed at a position that comes into the view of the observer.

Exemplary display devices of the disclosure may partially include parts of at least two of the plurality of embodiments illustrated in FIGS. 3A through 3D. In a display device that partially includes the embodiment of FIG. 3A and the embodiment of FIG. 3B, for instance, a plurality of optical elements that correspond to some of partition areas in the display element 1 may form virtual images on substantially the same image surface and a plurality of optical elements that correspond to the others of the partition areas may form virtual images on different image surfaces.

Figure 4:
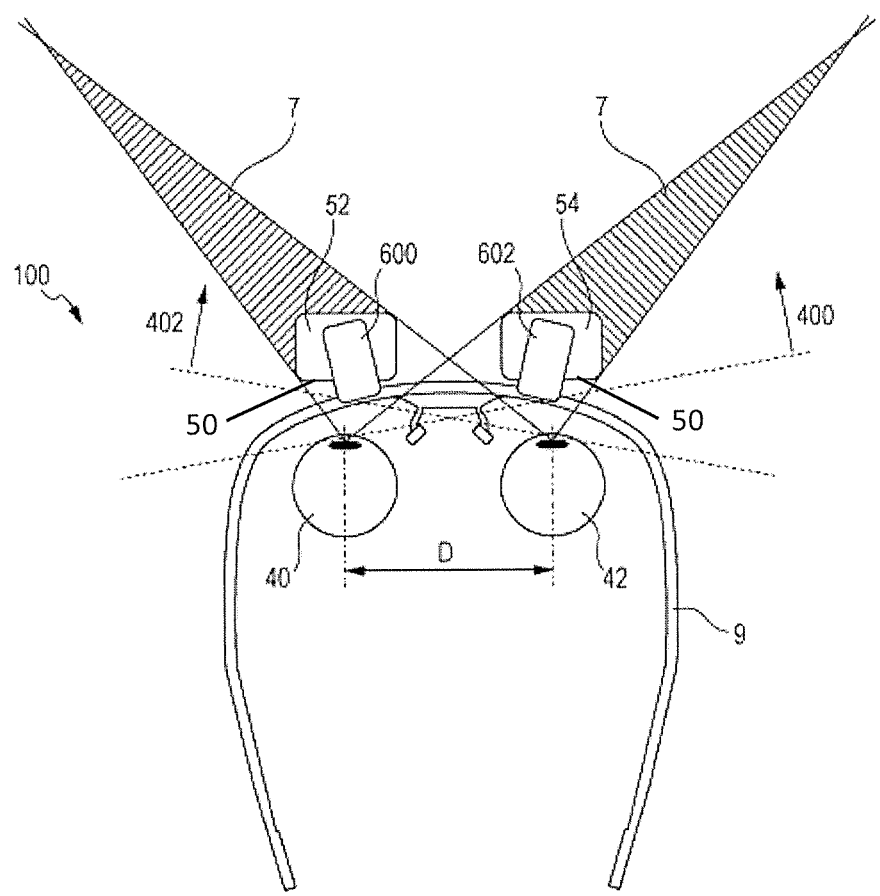
FIG. 4 is a top plan view that schematically illustrates a structure of a display device according to a modification to the embodiment and positional relation of the display device to both the eyes of the observer.

As illustrated in FIG. 4, a display device 100 according to a modification to the embodiments of the disclosure may include a projector 52 that corresponds to the left eye 40 and a projector 54 that corresponds to the right eye 42. FIG. 4 is a schematic diagram of the display device 100 according to another embodiment of the disclosure. In the display device 100, the projector 52 is connected through a connector 600 to the frame 9 and the projector 54 is connected through a connector 602 to the frame 9. In such a configuration, a stereoscopic vision with use of binocular parallax can be shown to the observer.

What is claimed is:

1. A display device comprising: a projector including an optical element that projects an image on one of left and right eyes of an observer; and a holder that holds the optical element; a frame that is connected to the projector and that is mountable on the observer; and a connector through which the projector and the frame are connected, wherein at least a part of the projector and the connector is placed in a visual field of the left eye and a visual field of the right eye when the frame is mounted on the observer, and wherein a length from a point of tangency between a leftmost line of sight among lines of sight of the left eye that overlap an outline of the at least the part of the projector and the connector and the outline of the at least the part of the projector and the connector to a point of intersection between an imaginary line that passes through the point of tangency in parallel with a direction of a pupillary distance of the observer and a rightmost line of sight among lines of sight of the right eye that overlap the outline of the at least the part of the projector and the connector is shorter than the pupillary distance in a top plan view of the display device when the frame is mounted on the observer.

2. The display device according to claim 1, wherein the projector is placed between an imaginary line that passes through a pupil of the left eye and that is perpendicular to the direction of the pupillary distance and an imaginary line that passes through a pupil of the right eye and that is perpendicular to the direction of the pupillary distance in the top plan view when the frame is mounted on the observer.

3. The display device according to claim 1, wherein the projector further includes
 a light emitting element, and
 a light shielder that blocks penetration of light from outside of the projector, and
wherein the optical element projects light, emitted from the light emitting element, as a virtual image onto the one of the left eye and the right eye.

4. The display device according to claim 3, wherein the light shielder is placed at a position where the light shielder interrupts a portion of the view of the observer.

5. The display device according to claim 1, wherein the length from the point of tangency to the point of intersection is shorter than 6.3 cm.

6. The display device according to claim 1, wherein a boundary between a visible area that is an area visible to the observer and an invisible area that is an area invisible to the observer is defined by interruption by the at least the part of the projector and the connector to view of the observer in the visual field of the left eye and the visual field of the right eye, when the frame is mounted on the observer.

7. The display device according to claim 1, wherein a width of the projector is larger than a width of the connector in the direction of the pupillary distance in the top plan view of the display device.

8. The display device according to claim 1, wherein at least a part of the projector and the connector is not placed between an imaginary line that passes through a pupil of the left eye and that is perpendicular to the direction of the pupillary distance and an imaginary line that passes through a pupil of the right eye and that is perpendicular to the direction of the pupillary distance in the top plan view when the frame is mounted on the observer.

9. A display device comprising: a first projector including: a first optical element that projects an image on left eye of an observer; and a first holder that holds the first optical element; a second projector including: a second optical element that projects an image on right eye of the observer; and a second holder that holds the second optical element; a frame that is connected to the first and second projectors and that is mountable on the observer; a first connector through which the first projector and the frame are connected; and a second connector through which the second projector and the frame are connected, wherein at least a part of the first projector and the first connector is placed in a visual field of the left eye and a visual field of the right eye when the frame is mounted on the observer, wherein a first length from a first point of tangency between a leftmost line of sight among lines of sight of the left eye that overlap an outline of the at least the part of the first projector and the first connector and the outline of the at least the part of the first projector and the first connector to a first point of intersection between an imaginary line that passes through the first point of tangency in parallel with a direction of a pupillary distance of the observer and a rightmost line of sight among lines of sight of the right eye that overlap the outline of the at least the part of the first projector and the first connector is shorter than the pupillary distance in a top plan view of the display device when the frame is mounted on the observer, wherein at least a part of the second projector and the second connector is placed in the visual field of the left eye and the visual field of the right eye when the frame is mounted on the observer, and wherein a second length from a second point of tangency between a leftmost line of sight among lines of sight of the left eye that overlap an outline of the at least the part of the second projector and the second connector and the outline of the at least the part of the second projector and the second connector to a second point of intersection between an imaginary line that passes through the second point of tangency in parallel with the direction of the pupillary distance and a rightmost line of sight among lines of sight of the right eye that overlap the outline of the at least the part of the second projector and the second connector is shorter than the pupillary distance in the top plan view of the display device when the frame is mounted on the observer.

10. The display device according to claim 9,
   wherein the first length from the first point of tangency to the first point of intersection is shorter than 6.3 cm, and
   wherein the second length from the second point of tangency to the second point of intersection is shorter than 6.3 cm.

* * * * *